United States Patent [19]

Welch

[11] 3,823,267

[45] July 9, 1974

[54] DATA TRANSLATOR AND RECORDING SYSTEM FOR USE WITH TONE GENERATING TELEPHONES

[75] Inventor: Jonnie Steven Welch, El Paso, Tex.

[73] Assignee: General Computer Service, Inc., El Paso, Tex.

[22] Filed: Aug. 26, 1971

[21] Appl. No.: 175,120

[52] U.S. Cl. .......................... 179/2 DP, 179/84 UF

[51] Int. Cl. .......................... H04m 11/06

[58] Field of Search .......... 179/2 DP, 6 R, 6 E, 2 R, 179/2 A, 84 VF; 340/409, 365

[56] References Cited

UNITED STATES PATENTS

| | | | |
|---|---|---|---|
| 3,240,427 | 3/1966 | Holman | 179/2 DP |
| 3,304,371 | 2/1967 | Rosenberg | 179/2 DP |
| 3,401,396 | 9/1968 | Wolf | 179/2 DP |
| 3,403,225 | 9/1968 | Mislan | 179/2 R |
| 3,417,202 | 12/1968 | Kolpek | 179/2 R |
| 3,549,809 | 12/1970 | Stehr | 179/2 DP |
| 3,573,376 | 4/1971 | Bartlett | 179/2 DP |
| 3,603,740 | 9/1911 | Cambridge | 179/84 VF |
| 3,618,038 | 11/1971 | Stein | 179/2 DP |
| 3,647,973 | 3/1972 | James | 179/2 DP |
| 3,651,267 | 3/1972 | Wittenberger | 179/2 DP |
| 3,652,795 | 3/1972 | Wolf | 179/2 DP;84 VF |
| 3,675,513 | 7/1972 | Flanagan | 179/84 VF |

*Primary Examiner*—Kathleen H. Claffy
*Assistant Examiner*—Thomas D'Amico

[57] ABSTRACT

The data translator and recording system includes a conventional tone generating telephone set, a data set connected to the telephone set, a data recording unit and a translator interconnecting the data set and the data recording unit. Tone signals manually generated on the telephone set are applied to the data set which converts each of the tone signals to a pair of D.C. signals which are then applied to the translator. The translator responds to each pair of D.C. signals by generating a short D.C. pulse which it applies to the data recording unit. The data recording unit in response to each D.C. pulse records one of the digits 0 through 9.

8 Claims, 2 Drawing Figures

PATENTED JUL 9 1974 3,823,267

SHEET 2 OF 2

DATA TRANSLATOR AND RECORDING SYSTEM FOR USE WITH TONE GENERATING TELEPHONES

BAKGROUND OF THE INVENTION

This invention relates to data communication systems and more particularly to a system for recording data in response to signals generated at a telephone station.

The widespread and varied use of automatic data processing has given rise to a variety of methods and systems for collecting and recording the data which ultimately is to be processed. One such system, generally referred to as a key tape system, includes a key tape unit for recording data on magnetic tape and a keyboard, similar to a typewriter keyboard for manually generating data signals which are applied to the key tape unit. Depressing a key on the keyboard unit causes a signal to be applied to the key tape unit resulting in the recording of the datum specified by the key depressed in the key tape unit. The keyboard devices, although providing for entering a variety of data into the key tape unit, are rather bulky and fairly complicated. Operation of such devices generally requires special training and is normally beyond the capability of the average secretary or clerk. Further, in the key tape systems in current use, depressing a key on the keyboard device for longer than a certain period of time causes multiple recordations of the datum specified by the key. Finally, the keyboard devices are usually located physically near the key tape unit so that an operator wishing to enter data into the unit must be present at the location of the unit.

SUMMARY OF THE INVENTION

It is an object of the present invention to provide a simple and economical system for recording data.

It is another object of the present invention to provide a data recording system which utilizes a tone generating telephone station for entering data into a data recording unit.

It is still another object of the present invention to provide apparatus for converting telephone generated signals into pulses suitable for causing the recordation in a data recording unit of a single one of the digits 0 through 9 for each telephone generated signal.

It is a further object of the present invention to provide a data recording system wherein data may be entered into a centrally located key tape unit from one or more distant telephone stations.

The above and other objects of the present invention are realized in an illustrative embodiment which includes a tone generating station such as a pushbutton telephone set for generating a plurality of tone signals by manually depressing keys located on the set. The station is connected to a data set either permanently or temporarily by dialing up the data set via the telephone network. After connection with the data set, each tone signal generated by the station is converted by the data set to a pair of D.C. signals which are applied to a translator. Regardless of the duration of the D.C. signals applied to the translator, the translator generates a short D.C. pulse in response to each pair of D.C. signals and applies the pulse to a selected input terminal of a data recording unit. The data recording unit, in response to each such pulse, and depending upon the input terminal over which such signal is received, records one of the digits 0 through 9 on a recording medium.

BRIEF DESCRIPTION OF THE DRAWINGS

A complete understanding of the present invention and of the above and other objects and advantages may be gained from a consideration of the following detailed description of a specific illustrative embodiment presented in connection with the accompanying drawings in which.

DETAILED DESCRIPTION

Figure 1:
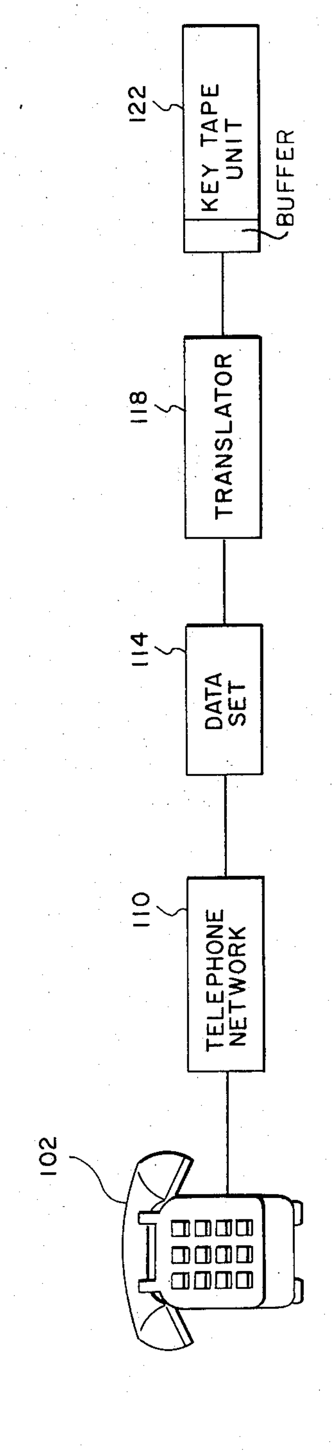
FIG. 1 shows a data recording system made in accordance with the principles of the present invention.

The system of FIG. 1 includes a conventional tone generating telephone set 102, sometimes referred to as a pushbutton telephone. The telephone set 102 includes 12 manually operable buttons, each for generating a different pair of tone or frequency signals. Ten of the buttons or keys are used for generating pairs of tone signals representing each of the numbers 0 through 9 and are used for establishing calls. The remaining two keys are used for generating pairs of tone signals which, for telephone purposes, do not at present represent any particular item of information. Pushbutton telephone sets are more particularly described in I. E. E. Transactions, Part 1, Communications and Electronics, No. 65, pages 1–24, March, 1963. (Note that the pushbutton telephone sets described in the aforesighted reference includes only 10 buttons, but the pushbutton sets in present use include 12 buttons.)

In place of the telephone set 102, the system of FIG. 1 could illustratively utilize a conventional dial-pulse telephone set together with a tone generating keyboard either acoustically coupled to the dial-pulse set or wired directly into the system through a data access arrangement.

The illustrative system of FIG. 1 further includes a telephone network 110 via which connections can be made from the telephone set 102 to a data set 114. Connections are made simply by keying on the telephone set 102 a telephone number assigned to the data set 114. Such keying causes the generation of tone signals or keying signals which are applied to the telephone network 110. If the data set 114 is not in use, the network 110 responds to the switching signals by connecting the telephone set 102 to the data set 114. The data set 114 might illustratively comprise the Bell Telephone System's Model 401J Data Set.

The data set 114, in response to being connected to the telephone set 102, applies a D.C. signal to a translator 118. In response to this D.C. signal, the translator 118 causes operating power to be applied to a key tape unit 122 thereby placing the key tape unit in a "ready-to-operate" condition. Any signals generated thereafter on the telephone set 102 are applied via the network 110 to the data set 114 which converts each pair of tone signals into a pair of D.C. signals which are applied to the translator 118. In response to each pair of signals representing one of the digits 0 through 9, the translator 118 applies a pulse of short duration to a selected input terminal of the key tape unit 122 thereby causing the key tape unit to record the digit represented in a buffer memory in preparation for the recording of the digit on magnetic tape. In response to each of the two pairs of signals which do not represent digits, the translator applies a signal to the key tape unit causing the key tape unit to either prepare to "record over" digits previously recorded in the buffer memory or perform a skip function. Depressing any of the keys labeled 0 through 9 on the telephone set 102 causes the key tape unit 122 to record the number or digit corresponding to the number on the key which is depressed. Thus, if the key labeled 3 were depressed, the numeral 3 would be stored in the key tape unit's buffer memory for ultimate recordation on magnetic tape. The functions performed by keying the buttons with the labels # and * will next be discussed.

When data is stored in key tape units in current use, it is generally divided into so-called records, each record including a number of fields, each field including a predetermined number of bits. The length of any field of a record may differ from the length of other fields of the record. As soon as the data "record" is accumulated in the key tape unit's buffer memory, the record is automatically transferred to magnetic tape.

Two functions performed by key tape units which rely on the record/field convention are the so-called "error home" or backspace function and the "skip" function. The error home function provides a type of back-spacing function in which the key tape unit is conditioned to write or record over data previously recorded in the key tape unit's buffer memory. The need for this function arises if, for example, an error is made during the entering of data in the record in question. The skip function provides for moving or "forward spacing" to the beginning of the next field in the record. Thus, for example, if no more data were to be written in a particular field and it were desired to go to the next field, the skip function would be initiated.

The error home and skip functions are provided in the system of FIG. 1 through the use of the two keys on the telephone set 102 having the labels * and #. When the button having the label * is depressed, the translator 118 responds by supplying a signal to the key tape unit 122 causing the key tape unit to perform the error home function. Pressing the key having the label # causes the translator 118 to signal the key tape unit 122 to "skip" to the next field. Pressing the # button again would cause the key tape unit 122 to skip to still the next field, etc. Of course, the selection of buttons for providing the different functions is arbitrary and any of the buttons could be selected to provide any of the different functions.

After the key tape unit 122 has recorded a complete record and as the record is being written on the key tape and verified, the key tape unit signals the translator 118 which in turn signals the data set 114 to apply an audible tone via the network 110 to the telephone set 102 thereby signaling the system user that the particular record has been written. (The signal applied by the key tape unit 122 to the translator 118 is derived from the operation of the tape solenoid in the key tape unit.) The key tape unit 122 of FIG. 1 might illustratively comprise the key tape unit of National Cash Register, Inc., Model 736.

The system of FIG. 1 provides for the entry and recording of data on a standard key tape unit without the necessity of utilizing the more complicated key tape unit keyboard. Further, many users at different locations can utilize a single data set, translator and key tape unit at a central location simply by dialing up the data set on their tone generating telephone sets. The translator 118, one illustrative embodiment of which is shown in detail in FIG. 2, makes possible the use of the other standard units in the configuration shown in FIG. 1.

Figure 2:
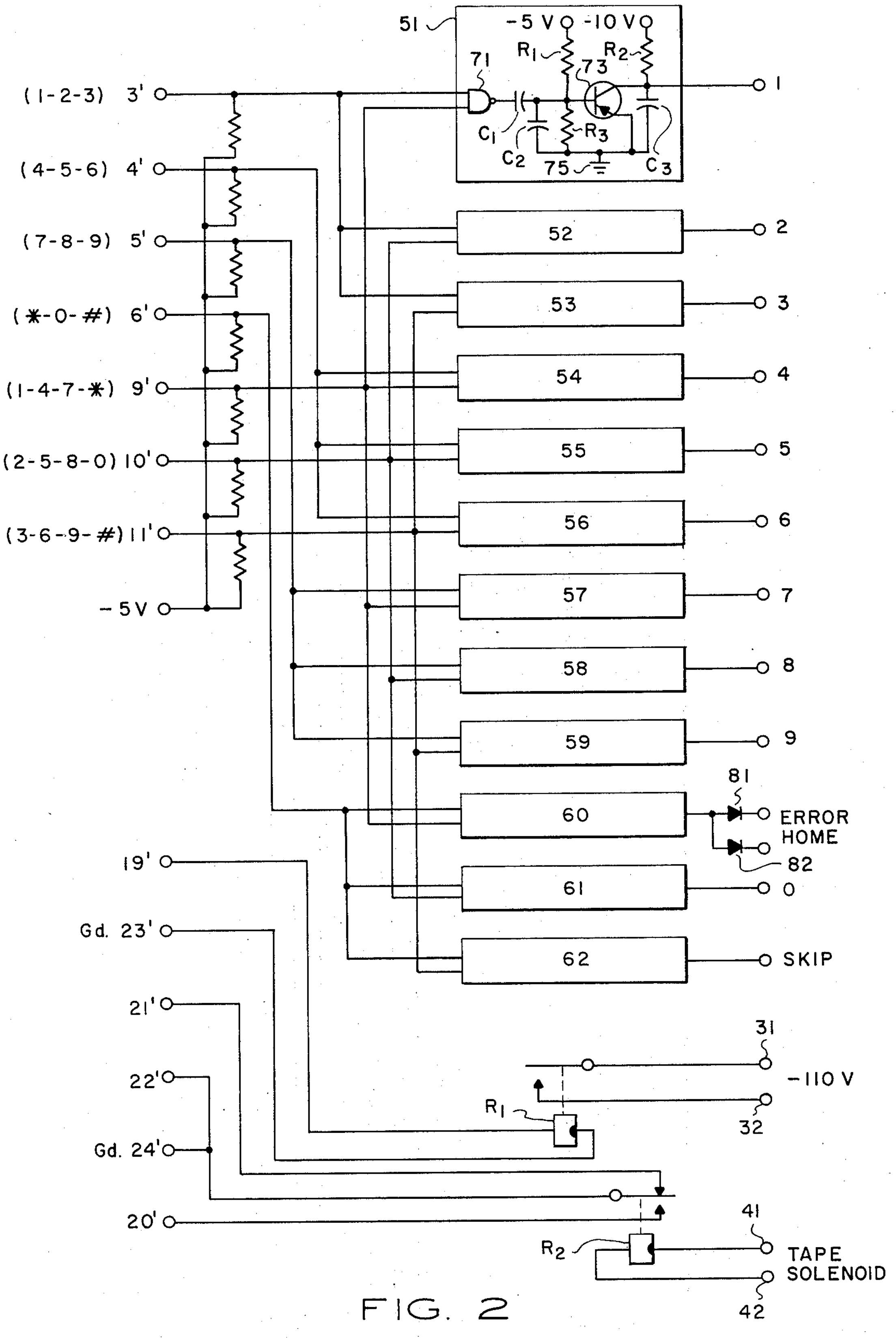
FIG. 2 shows an illustrative embodiment of the translator of FIG. 1.

The illustrative translator of FIG. 2 includes a plurality of terminals 3', 4', ..., 22', 24' and 20' (on the left-hand side of FIG. 2) which are connected to correspondingly numbered terminals on a Bell Telephone System Model 401J Data Set. That is, terminal 3' is connected to a terminal or pin 3 of the data set, terminal 4' is connected to pin 4 on the data set, etc. The translator of FIG. 2 further includes terminals 1, 2, ..., 41 and 42 (on the right-hand side of FIG. 2) which are connected into a key tape unit, such as National Cash Register's (NCR) Model 736, to corresponding terminals to which a key tape unit keyboard would be connected. In particular, terminals 1, 2, ...,0 of the translator would be connected into the NCR keytape unit at the same point at which the outputs of the corresponding numeral keys of the keyboard would be connected and the keyboard would be locked in the upper case condition. Terminals labeled "Error" and "Home" of the translator would be connected to column counter reset circuitry of the keytape unit at the same points at which the outputs of the "Error" and "Home" keys respectively of the keyboard are connected. The "Skip" terminal would be connected to skip control circuitry of the keytape unit at the same point at which the output of the "Skip" key of the keyboard is connected. Terminals 41 and 42 would be connected across the forward motion tape solenoid.

The translator further includes units 51 through 62 each of which interconnect a different pair of the terminals 3', ..., 11' to a different one of the terminals 1, ..., "error home," 0 or "skip." Also included is a relay R1 for interconnecting terminals 31 and 32 and a relay R2 for disconnecting terminals 21' and 24' and for interconnecting terminals 24' and 20'.

The inputs (those derived from terminals 3' through 11') to units 51 through 62 are normally at a potential of −5 volts, being connected via resistors to a −5 volt source. Whenever a key on the telephone set 102 (FIG. 1) is depressed, a D.C. signal of ground potential is applied by the data set 114 to two of the terminals of terminals 3' through 11' of FIG. 2. The terminals to which the D.C. signals are applied is indicated by the designations in parenthesis to the left of the terminals 3' through 11'. For example, when the key on the telephone set corresponding to number 3 is depressed, a D.C. signal is applied to terminal 3' and to terminal 11'. Similarly, if the key on the telephone set corresponding to the number 8 is depressed, a D.C. signal is applied to terminal 5' and terminal 10'. Note that one signal of each pair of signals applied to the terminals is applied to one of the terminals 3' through 6' and the other signal of the pair is applied to one of the terminals 9' through 11'.

Each pair of signals applied to the terminals 3' through 11' is applied to a particular one of the units 51 through 62. Assume that D.C. signals are applied to terminals 3' and 9' (which would occur if the key corresponding to the number 1 were depressed on the telephone set) and thus to the unit 51. Prior to the application of the signals to the unit 51, the output of a NAND gate 71 is at ground potential. Thus, a transistor 73 is maintained in the OFF condition and the voltage at the collector of the transistor and thus at the terminal 1 is at −10 volts due to the −10 volt source connected via a resistor R2 to the collector. Application of the D.C. signals of ground potential to the unit 51 enables the NAND gate 71 causing the NAND gate to apply a −5 volt signal to a capacitor C1. This signal is maintained on the output of the NAND gate 71 as long as the D.C. signals are applied to its input. Upon generation of the negative signal by the NAND gate 71, the capacitor C1 which operates as a differentiating capacitor, causes a negative pulse to be applied to the base of the transistor 73. This negative pulse causes the transistor 73 to turn ON thus providing a conductive path from terminal 1 to a ground potential source 75. The transistor 73 is maintained in the ON condition only for a time approximately equal to the duration of the pulse received from the capacitor C1. After receipt of the pulse, the transistor 73 turns off and the voltage level at the collector of the transistor again becomes 10 volts (after a short period of time equal to the charge time of capacitor C3). Thus, a short pulse of ground potential is applied to the output terminal 1 for each pair of signals applied to NAND gate 71.

The duration of the pulses applied to the output terminal 1 may have various values but should not be so long that they cause multiple recordations of the data item represented by terminal 1. The threshold duration which would cause multiple recordations varies from one key tape unit to another but is easily determinable for any particular key tape unit by simply applying pulses of various duration to the unit until the threshold duration is found. The duration of the pulse applied to terminal 1 might illustratively be 5 milliseconds; other pulse durations less than the threshold duration of the key tape unit utilized could also be employed.

The resistors R1, R2 and R3 are for biasing the transistor 73. The capacitors C2 and C3 are provided to prevent noise or other spurious signals which reach the base or collector of the transistor 73 from adversely affecting the operation of the transistor. The capacitor C2 also acts to maintain the transistor 73 in the ON condition for a period of time slightly longer than the duration of the pulse applied from the capacitor C1 to the base of the transistor 73.

Units 52 through 59 and 61 includes circuitry identical to that of unit 51. Units 60 and 62 include circuitry the same as that of unit 51 except that neither unit includes a capacitor corresponding to capacitor C1 of unit 51. That is, the NAND gate of units 60 and 62 is connected directly to the base of the transistor of those units. Thus, the output signals on the terminals labeled "error home" and "skip" continues as long as the D.C. input signals are applied to the respective NAND gates.

The units 51 through 69 and 61 operate to detect a change in the D.C. signals applied thereto and generate a short output pulse when such a change is detected. Other circuits could be utilized for the units 51 through 59 and 61 such as, for example, monostable or one-shot multivibrators.

The terminals on the right-hand side of FIG. 2 are labeled to indicate either the functions performed by the key tape unit when a signal is applied to the terminals by the translator or to indicate the apparatus in the key tape unit to which the terminals are connected. Thus, when a pulse is applied to terminals 1, 2, ..., 9, or 0, the key tape unit is actuated to record the number corresponding to the lead over which the pulse was received, i.e., if a pulse were applied to terminal 1, then the number 1 would be recorded by the key tape unit on magnetic tape, etc. A signal applied to the terminals labeled "error home" would cause the key tape unit to perform the error home function. (Note that the two diodes 81 and 82 are simply for isolating the two output terminals to which they are connected.) Application of a signal to the terminal labeled "skip" would cause the key tape unit to perform the skip function. Terminals 31 and 32, when interconnected by relay R1, cause power to be applied to the key tape unit to turn it on. Terminals 41 and 42 are connected to the key tape unit such that a signal is applied to one of the terminals 41 or 42 when the key tape unit tape solenoid is energized—the tape solenoid is energized at the completion of each record on the magnetic tape. The overall operation of the translator of FIG. 2 will now be described.

When a connection is established by the telephone set 102 to the data set 114 of FIG. 1, a D.C. current is applied to terminal 19' on the left-hand side of FIG. 2 thereby energizing the relay R1 which, in turn, causes the contacts of the relay R1 to close, thereby interconnecting terminals 31 and 32. This effects the turning on of the key tape unit by causing electrical power to be applied thereto.

After a connection has been established between the telephone set 102 and the data set 114 and the key tape unit 122 has been turned on, numerical data may be recorded in the key tape unit 122 by keying appropriate buttons on the telephone set 102. Application of D.C. signals to pairs of the input terminals 3' through 11' will cause the application of a D.C. pulse of short duration to one of the terminals 1, 2, ..., 9 or 0. Application of D.C. signals to terminals 6' and 9' will cause the application of a D.C. signal to the terminals labeled "error home" thereby causing the key tape unit to perform the error home function. Application of D.C. signals to terminals 6' and 11' causes the application of a D.C. signal to the terminal labeled "skip" thereby causing the key tape unit to perform the skip function.

As a record is being written in the key tape unit, a signal is applied to terminal 41 thereby causing relay R2 to operate thus interconnecting terminal 24' with terminal 20'. Interconnecting these terminals causes the data set to transmit an audible signal to the telephone set thereby notifying the system user that a record has been completed. Note that terminal 22' is permanently connected to terminal 24' which is at ground potential. This simply indicates to the data set that the data set may receive and maintain a call, i.e., a connection from a telephone set.

Upon completion of recording the data desired, the telephone set 102 may be placed on-hook and this will cause the data set 114 to remove the D.C. current from terminal 19' thereby turning off the key tape unit.

It is to be understood that the above described embodiments are only illustrative of the principles of the present invention. Modification of these embodiments may be devised by those skilled in the art without departing from the spirit and scope of the invention. The appended claims are intended to cover such modifications.

I claim:

1. A system for applying data to a data recording unit comprising a station for generating a plurality of frequency signals,
a data set connected to said station for translating said frequency signals into D.C. signals and for generating an additional D.C. signal,
a data recording unit for recording a single item of data in response to a D.C. pulse,
a translator including a plurality of logic devices each of which is responsive to a different pair of said D.C. signals from said data set for applying to said data recording unit a D.C. pulse of a sufficiently short duration to cause said data recording unit to record a single data item, each of said logic devices comprising
means responsive to a pair of D.C. signals from said data set for generating an output signal,
a voltage source,
a transistor whose collector is coupled to said data recording unit and whose emitter is coupled to said voltage source,
a capacitor interconnecting said output signal generating means with the base of said transistor,
a resistor interconnecting the base of said transistor with said voltage source, and
a second capacitor interconnecting the collector of said transistor with said voltage source.

2. The system of claim 1 wherein each of said logic units further comprises a third capacitor connected in parallel with said resistor, second and third voltage sources, a second resistor interconnecting the base of said transistor with said second voltage source, and a third resistor interconnecting the collector of said transistor with said third voltage source.

3. The system of claim 1 wherein said translator further comprises a logic device responsive to said additional D.C. signal for causing electrical power to be applied to said data recording unit.

4. A data recording system comprising
a telephone set having 12 keys, 10 of which are for manually generating 10 tone signals each representing a different one of the 10 numerals 0 through 9 and the other two of which are for manually generating 11th and 12th tone signals,
a data set including seven output terminals first through seventh, for converting each of said tone signals into a pair of D.C. signals, one signal of each pair being applied to one of the output terminals fifth through seventh, the output terminals to which any pair of D.C. signals are applied being dependent upon the tone signal converted, said 11th tone signal causing application of D.C. signals to said fourth and fifth output terminals and said 12th tone signal causing application of D.C. signals to said fourth and seventh output terminals,
a data recording unit including 12 input terminals and a buffer memory for recording data records, each record comprising a certain number of data fields, each field comprising one or more bits, said unit being responsive to electrical pulses applied to any one of 10 of said input terminals $n_1, ..., n_{10}$ for recording one of the numerals 0 through 9, responsive to an electrical signal applied to an eleventh one of said input terminals $n_{11}$ for preparing to record data over any data record or portion thereof previously recorded in said memory, and responsive to an electrical signal applied to a twelfth one of said input terminals $n_{12}$ for skipping to a next data field, and
a translator comprising a plurality of logic units first through tenth each interconnecting selected pairs of said output terminals with a different one of said input terminals $n_1$ through $n_{10}$, one output terminal of each pair being one of the terminals first through fourth and the other output terminal of the pair being one of the terminals fifth through seventh, said logic units each including means responsive to D.C. signals applied to the two output terminals to which the logic unit is connected for applying an electrical pulse to the input terminal to which the logic unit is connected, said electrical pulse being of a fixed duration independent of the duration of said D.C. signals, said translator further comprising an eleventh logic unit interconnecting said fourth and fifth output terminals with said input terminal $n_{11}$, and a 12th logic unit interconnecting said fourth and seventh output terminals with said input terminal $n_{12}$, said 11th and 12th logic units each including means responsive to the D.C. signals applied to the two output terminals to which the logic unit is connected for generating and applying an electrical signal to the respective input terminal to which the logic unit is connected, said electrical signal being of a duration approximately equal to the duration of the D.C. signals in response to which the electrical signal is generated, the means of said 11th and 12th logic units comprising circuitry responsive to a pair of D.C. signals for generating an output signal and a transistor whose collector is connected to a corresponding one of said input terminals and whose base is connected to said output signal generating circuitry.

5. The system of claim 4 wherein the means of said first through 10th logic unit comprises circuitry responsive to a pair of D.C. signals for generating an output signal and a transistor whose collector is connected to a corresponding one of said input terminals, whose emitter is coupled to a voltage source, and whose base is coupled to the output signal generating circuitry.

6. The system of claim 5 wherein the means of said first through tenth logic units further comprises a capacitor interconnecting the collector of said transistor to said voltage source, and a resistor interconnecting the base of said transistor to said voltage source.

7. In a system including a station for generating a plurality of tone signals, and a data set for converting said tone signals to pairs of D.C. signals of duration substantially equal to the duration of the tone signal converted,
a data recording unit responsive to D.C. pulses for recording single items of data, and
a translator interconnecting said data set and said data recording unit and comprising a plurality of logic means, each responsive to a different pair of D.C. signals from said data set for applying a D.C. pulse to said data recording unit, each of said logic means comprising
means responsive to a pair of D.C. signals from said data set for generating an output signal, a first voltage source,
a transistor whose collector is coupled to said data recording unit, whose emitter is coupled to said first voltage source, and whose base is coupled to said output signal generating means, a capacitor interconnecting the collector of said transistor to said first voltage source, a second voltage source, and a resistor interconnecting said second voltage source to the collector of said transistor.

8. The system of claim 7 wherein each of said logic means further comprises a third voltage source coupled to the base of said transistor and a resistor interconnecting the base of said transistor with said first voltage source.

* * * * *